United States Patent [19]
Okada et al.

[11] Patent Number: 6,117,511
[45] Date of Patent: Sep. 12, 2000

[54] OPTICAL RECORDING MEDIA

[75] Inventors: Mitsuya Okada; Masaki Itoh; Syu-Ichi Ohkubo, all of Tokyo, Japan

[73] Assignee: NEC Corporation, Tokyo, Japan

[21] Appl. No.: 09/088,067

[22] Filed: Jun. 1, 1998

[30] Foreign Application Priority Data

Jun. 3, 1997 [JP] Japan .................................. 9-145491

[51] Int. Cl.[7] ...................................................... B32B 3/00
[52] U.S. Cl. ...................... 428/64.1; 428/64.2; 428/64.4; 428/64.5; 428/64.6; 428/64.7; 428/457; 428/913; 430/270.13; 430/495.1; 430/945; 369/283; 369/288
[58] Field of Search ................................ 428/64.1, 64.2, 428/64.4, 64.5, 64.6, 64.7, 457, 702, 913; 430/270.13, 495.1, 945; 369/275.1, 283, 288

[56] References Cited

U.S. PATENT DOCUMENTS

| | | |
|---|---|---|
| 5,587,216 | 12/1996 | Yoshioka et al. . |
| 6,004,646 | 12/1999 | Ohno et al. .............................. 428/64.1 |

FOREIGN PATENT DOCUMENTS

| | | |
|---|---|---|
| 0 574 025 A2 | 12/1993 | European Pat. Off. . |
| 0 630 007 A1 | 12/1994 | European Pat. Off. . |
| 0 766 240 A2 | 4/1997 | European Pat. Off. . |
| 0 847 049 A2 | 6/1998 | European Pat. Off. . |
| 0 849 729 A2 | 6/1998 | European Pat. Off. . |
| 55-45166 | 3/1980 | Japan . |
| 2-113451 | 4/1990 | Japan . |
| 6-231487 | 8/1994 | Japan . |
| 7-93804 | 4/1995 | Japan . |
| 8-31014 | 2/1996 | Japan . |
| 8-69636 | 3/1996 | Japan . |
| 8-102083 | 4/1996 | Japan . |
| 8-249721 | 9/1996 | Japan . |

OTHER PUBLICATIONS

English translation of Examiner's comments in Japanese Office Action dated Apr. 27, 1999.

Kazuhiro, N., "Recording and reproducing method of optical recording medium," *Patent Abstracts of Japan*, Feb. 16, 1997.

Keigo, T., "Optical information recording medium," *Patent Abstracts of Japan*, Oct. 13, 1995.

Shoichi, K., "Rewritable optical information recording medium," *Patent Abstracts of Japan*, Aug. 13, 1993.

*Primary Examiner*—Elizabeth Evans
*Attorney, Agent, or Firm*—McGuire Woods

[57] ABSTRACT

An optical data recording medium utilizing reversible intercrystalline-amorphous phase changes for recording, reproducing and erasing data as phase changes of a recording film caused by laser beam irradiation. The medium is formed by a lamination of a transparent substrate having tracking guide grooves for laser beam tracking, a base film formed on the substrate, a first protective film formed on the base film, a phase change type recording film formed on the first protective film, a second protective film formed on the recording film, and a reflecting film formed on the second protective film. Thus formed, the medium improves the overwriting characteristics of phase change type optical discs and permits high density recording.

13 Claims, 5 Drawing Sheets

Sub./SiO2(d)/ZnS-SiO2(55nm)/GeSbTe(12)/ZnS-SiO2(25)/AI(100)/UV

Sub./SiO2(d)/ZnS-SiO2(10nm)/GeSbTe(12)/ZnS-SiO2(25)/AI(100)/UV

1ST PROTECTIVE FILM THICKNESS(nm)
Sub./ZnS-SiO2(d)/GeSbTe(12)/ZnS-SiO2(25)/Al(100)/UV

OPTICAL RECORDING MEDIA

BACKGROUND OF THE INVENTION

The present invention relates to optical data recording media for high density recording, reproducing and erasing data with a laser beam and, more particularly, to optical data recording media, in which intercrystalline-amorphous structure and optical characteristics vary in dependence on the thermal hysteresis differences due to its temperature rise or fall caused by laser beam irradiation.

Optical disc recording systems using laser beam permit high capacity recording and contact-free fast accessing, and there is an increasing trend in their applications for high capacity memories. Optical discs are classified into those of reproduction or read only type known as compact discs and laser discs, those of write-once type capable of recording by users themselves, and re-writable type capable of repeated recording and erasing on the user side. Optical discs of the write-once and re-writable types are used as external memories for computers and document/image files.

Among re-writable optical discs are phase change type optical discs utilizing phase changes of recording films and magneto-optical discs utilizing changes in the magnetizing direction of perpendicularly magnetized films. The phase change type optical discs do not require any external magnetic field and readily permit over-writing, and are thus expected to become a main type of re-writable optical discs.

Commonly termed phase change type optical discs are well known in the art, which use recording films capable of undergoing inter-crystalline-amorphous phase changes in response to laser beam irradiation and are re-writable. In the phase change type optical disc, data is recorded as inter-crystalline-amorphous phase changes caused by locally elevating the recording film temperature with irradiation of the recording film by a laser beam spot of high power corresponding to the data to be recorded, and the recorded data is reproduced by reading optical constant changes accompanying it as reflected light intensity differences or phase changes with a low power laser beam.

For example, in a phase change optical disc using a recording film of a relatively long crystallization time, the recording film of the disc is elevated in temperature beyond the melting point in response to laser beam irradiation, and the irradiated film potions are made non-crystal by fast cooling them after the laser beam has passed, thereby effecting recording of data. When erasing data, the recording film is crystallized by holding the recording film temperature for a period of time sufficient for crystallization to proceed in a crystallizable temperature range above the crystallizing temperature and below the melting point. In a well-known method of doing so, a laser beam which is elongate in the direction of its process is used for irradiation. In the case of making two-beam psuedo over-writing for recording new data while erasing the data having been recorded, an oval laser beam for erasing is irradiated prior to the irradiation with the oval laser beam for recording.

In case of a disc using a recording film capable of being fast crystallized, a single circularly converged laser beam is used. In a well-know method, the laser beam power is changed between two levels for crystallization or non-crystallization. Specifically, when the recording film has been irradiated with a laser beam which can elevate the recording film temperature beyond the melting point, most of it becomes amorphous at the time of the cooling. On the other hand, portions of the recording film, which have been irradiated with a laser beam of such power that the recording film can reach a temperature above the crystallizing temperature and below the melting point, reach the crystal state.

The recording film of the phase change type disc is formed by using a charcogenite material, e.g., those of GeSbTe type, InSbTe type, InSe type, InTe type, AsTeGe type, $TeO_x$—GeSn type, TeSeSn type, SbSeBi type, BiSeGe, etc. Using either material, the film is formed by a resistance heating vacuum deposition process, an electron beam vacuum deposition process, a sputtering process, etc. Right after its formation, the recording film is in a sort of amorphous state, and it is initialized to make it to be entirely crystalline for forming amorphous record portions by recording data on it. The recording is effected by forming amorphous portions of the film in the crystallized state thereof.

As conventional means for high density data recording on an optical disc, it is effective to combine mark edge recording and land/groove recording in combination.

Reflectance difference reproduction type media are well known in the art, are of a type for recording amorphous marks in a high reflectance crystalline portion and have a high reflectance difference between the crystalline and non-crystaline portions. In an application of such a reflectance difference reproduction medium for the mark edge recording, the absorptance of the crystalline portion is considerably lower than that of the amorphous portion because of absence of light transmitted through the medium. Therefore, recording mark distortion cannot be held low in high linear speed over-writing.

To overcome this drawback, a commonly termed phase difference reproduction type phase change optical disc has been proposed, in which the optical phase difference between crystalline and amorphous portions is reduced and the reflectance difference between the two portions is increased (as disclosed in, for instance, Japanese Laid-Open Patent Publication No. 7-93804). However, in this system it is necessary to set the phase difference to the neighborhood of 180 degrees. This means that it is necessary to accurately control the thicknesses of the individual layers of the medium so as to realize a desired phase difference.

FIG. 5 shows the structure of a prior art phase difference reproduction type medium. As shown, the structure is a laminate of substrate 1, first protective film 3, recording film 4, second protective film 5, reflective film 6 and protective region (or ultraviolet-setting resin) 7. The optical characteristic of this medium is shown in FIG. 6. As is seen from FIGS. 5 and 6, to realize the phase difference of 180 degrees which provides the utmost effects in the phase difference reproduction, the thickness of the first protective film may be set to the neighborhood of 45 or 195 nm. However, the thickness margins are narrow. From the standpoint of the thickness control in the film formation, the thickness of the first protective film is suitably 60 nm. With this structure, however, the substrate is thermally damaged by heating when recording data. Therefore, the structure is inadequate for repeated use.

In the land/groove recording as the other effective high density recording means, it is necessary to make even the amplitude levels of reproduced signals from groove and groove tracks of track guide grooves. To realize this, it is required to accurately set the intercrystalline-amorphous optical phase difference to the neighborhood of zero degree with the reflectance reproduction type medium and to the neighborhood of 180 degrees with the phase difference reproduction type medium. With the well-known medium having the structure as shown in FIG. 5, it is inevitable to set a large thickness of the first protective layer (to the neighborhood of 170 nm in the case of the first protective film in FIG. 6, for instance), and in this case the thickness variations for the first protective film greatly influence the phase difference.

SUMMARY OF THE INVENTION

An object of the present invention is to provide a novel optical data recording medium, which can overcome the above drawbacks, improve the over-writing characteristics of phase change type optical discs and permit high density recording. According to the present invention, an optical data recording medium can be obtained, which has a selected medium structure capable of being readily formed while executing desired optical characteristics control.

According to the present invention, there is provided an optical data recording medium utilizing reversible inter-crystalline-amorphous phase changes for recording, reproducing and erasing data as phase changes of a recording film caused by laser beam irradiation, comprising a transparent substrate having tracking guide grooves for laser beam tracking, a base film formed on the substrate, a first protective film formed on the base film, a phase change type recording film formed on the first protective film, a second protective film formed on the recording film, and a reflecting film formed on the second protective film.

The refractive index of the base film is higher than the refractive index of the protective film at the wavelength of the laser beam. The data is recorded in both land and groove parts of the tracking guide grooves. The phase difference of reflected light beams form crystalline and amorphous portions of the recording film is set to the neighborhood of 0 degree. The phase difference of reflected light beams from crystalline and amorphous portions of the recording film is set to the neighborhood of 180 degree. The optical data recording medium further comprises a protective resin formed on the reflecting film.

The base film is formed by selecting a material having a refractive index optically lower than that of the first protective film and close to that of the substrate. The first protective film is formed using $ZnS$—$SiO_2$ and the substrate is formed using a polycarbonate resin having refractive indexes of 2.10 and 1.59, respectively at a wavelength of 650 nm.

The optical data recording medium is formed with a lamination of polycarbonate substrate, $SiO_2$ base film, $ZnS$—$SiO_2$ first protective film, GeSbTe recording film, $ZnS$—$SiO_2$ second protective film, Al reflecting film and ultraviolet-setting protective resin is formed.

The substrate is formed by using disc-like glass or plastics of one of reinforced glass, polycarbonate resin, PMMA resin and polyolefin resin. The base film is formed using a material having a refractive index lower than that of the first protective film. The base film is the material having a refractive index close to that of the transparent substrate selected among $SiO_2$, $MgF_2$, $CaF_2$, NaF, $Na_3AlF_6$, LiF, $Al_2O_3$, $CeF_3$, MgO, SiO, $ThO_2$, $PbF_2$, $SnO_2$ and $La_2O_3$. The first and second protective films are formed by using dielectric materials selected among $SiO_2$, $Si_3N_4$, AlN, $TiO_2$, ZnS and $ZnS$—$SiO_2$. The recording film is formed by using charcogenite materials selected among GeSbTe type, InSbTe type, InSe type, InTe type, AsTeGe type, $TeO_x$—GeSn type, TeSeSn type, SbSeBi type and BiSeGe type. The reflecting film is formed by using metals or transparent high refractive index materials selected among Al, Ai—Ti, Al alloys, Au, Ag, Si and Ge.

Other objects and features will be clarified from the following description with reference to attached drawings.

PREFERRED EMBODIMENTS OF THE INVENTION

Preferred embodiments of the present invention will now be described with reference to the drawings.

Design principles of the optical data recording medium according to the present invention will first be described. According to the present invention, a base film is formed on a transparent substrate, and then a first protective film is formed. The base film is desirably formed by selecting a material, which has a refractive index optically lower than that of the first protective film and close to that of the substrate. For example, when using $ZnS$—$SiO_2$ for the first protective film and a polycarbonate resin for the substrate, the refractive indexes of $ZnS$—$SiO_2$ and the substrate resin are 2.10 and 1.59, respectively, at a wavelength of 650 nm. In this case, $SiO_2$ which usually has a reflective index of 1.46 may be selected for the base film.

Figure 1:
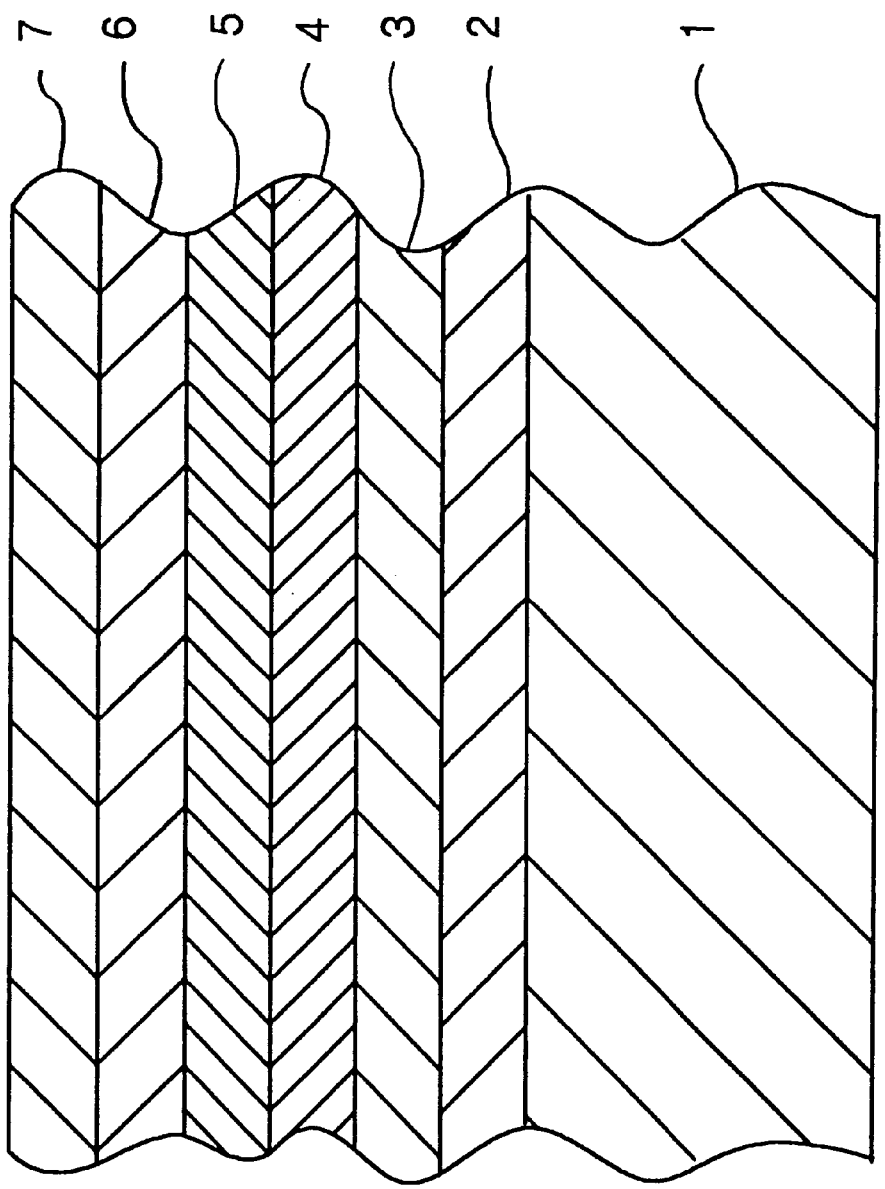
FIG. 1 is a schematic sectional view showing an embodiment of the optical data recording medium according to the present invention.

FIG. 1 is a schematic sectional view showing an embodiment of the optical data recording medium according to the present invention. The structure of this embodiment of the optical data recording medium is a laminate of substrate 1, base film 2, first protective film 3, recording film 4, second protective film 5, reflecting film 6 and protective resin (ultraviolet-setting resin) 7. It is possible to set a small thickness of the first protective film, of $ZnS$—$SiO_2$, for instance, by using a material having optical constants close to those of the substrate.

Figure 5:
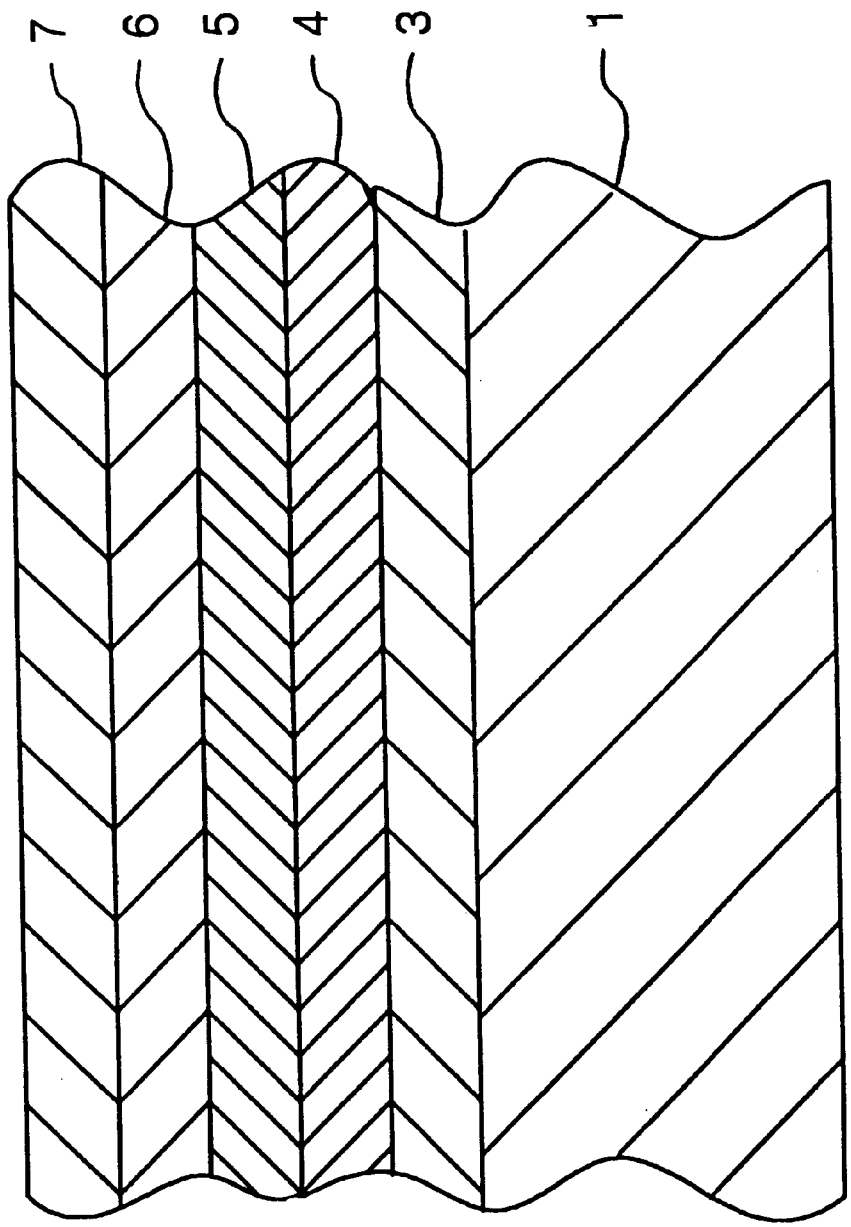
FIG. 5 shows the structure of a prior art phase difference reproduction type optical data recording medium.
Figure 6:
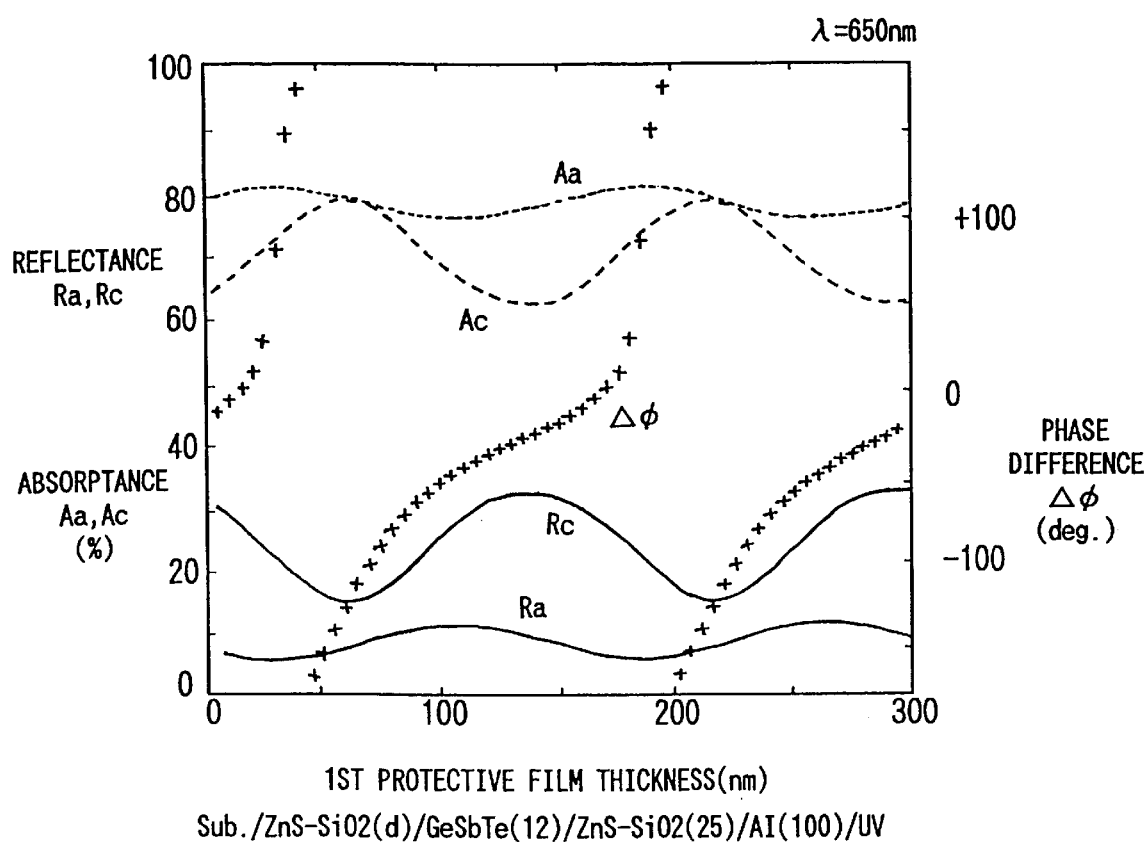
FIG. 6 shows an optical characteristic about reflectance absorption and optical phase difference of the prior art optical data recording medium.

With the prior art structure, it is impossible to ensure repeat over-writing resistance by setting the thickness between the recording film and the substrate to a value smaller than 100 nm. Therefore, when it was desired to set the inter-crystalline-amorphous phase difference to 180 degrees, as shown in FIG. 5, it was necessary to control the film formation accurately such that the thickness of the first protective film is in the neighborhood of 200 nm. Also, when it was desired to set the phase difference to the neighborhood of 0 degrees, the film formation should be accurately controlled such that the thickness of the first protective film is in the neighborhood of 170 nm.

According to the present invention, for preventing damage to the substrate in over-writing, the ground layer may be formed such that it is relatively thin, and also a degree of freedom is provided for the thickness setting. It is thus possible to select a small thickness of the first protective film, which permits satisfactory control of the film setting at the time of the film formation.

Figure 2:
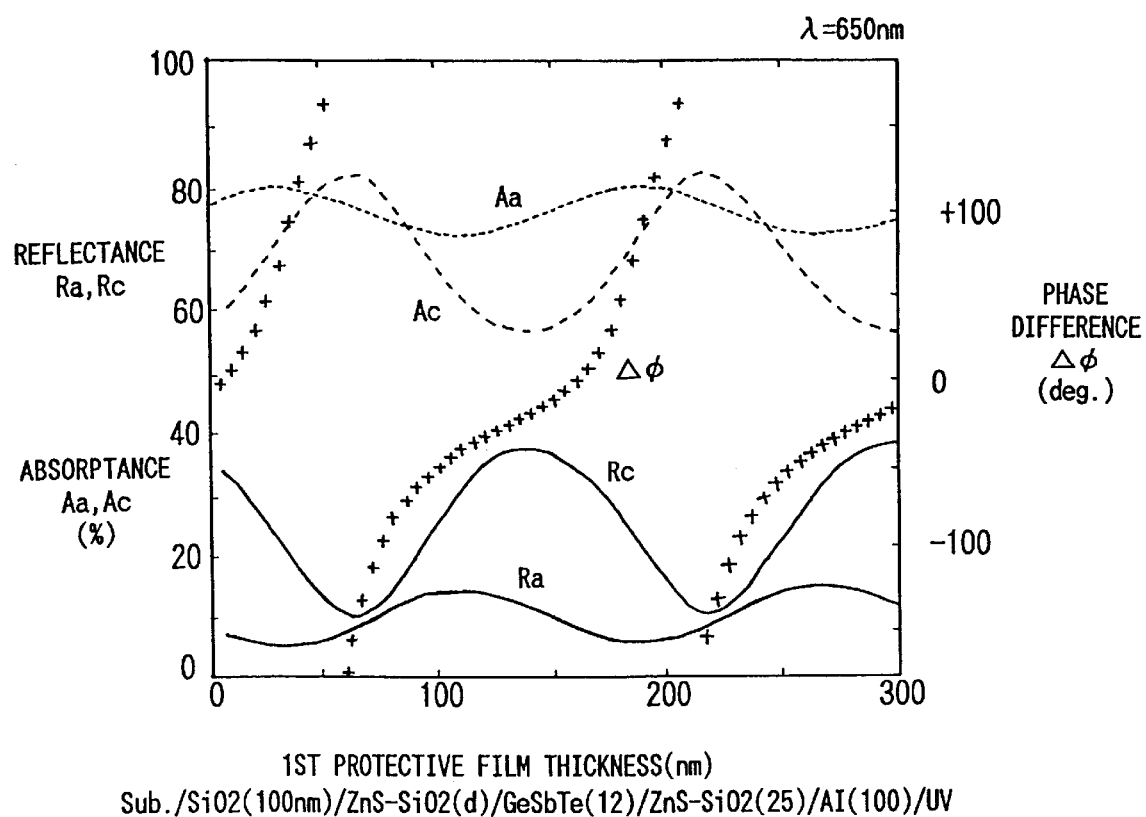
FIG. 2 shows an optical characteristic about reflectance absorption and optical phase difference of the optical data recording medium according to the present invention.

FIG. 2 shows an optical characteristic about reflectance absorption and optical phase difference of the optical data recording medium according to the present invention with an optical design example in the lamination of polycarbonate substrate, $SiO_2$ base film, $ZnS$—$SiO_2$ first protective film, GeSbTe recording film, $ZnS$—$SiO_2$ second protective film, Al reflecting film and ultraviolet-setting protective resin. It will be seen from the Figure that when a base film thickness of 100 nm is selected, a first protective film thickness of 55 nm can be selected to obtain a medium with a phase difference of 180 degrees. Also, a first protective film thickness of 10 nm can be selected to obtain a medium with a phase difference of 0 degrees.

Figure 3:
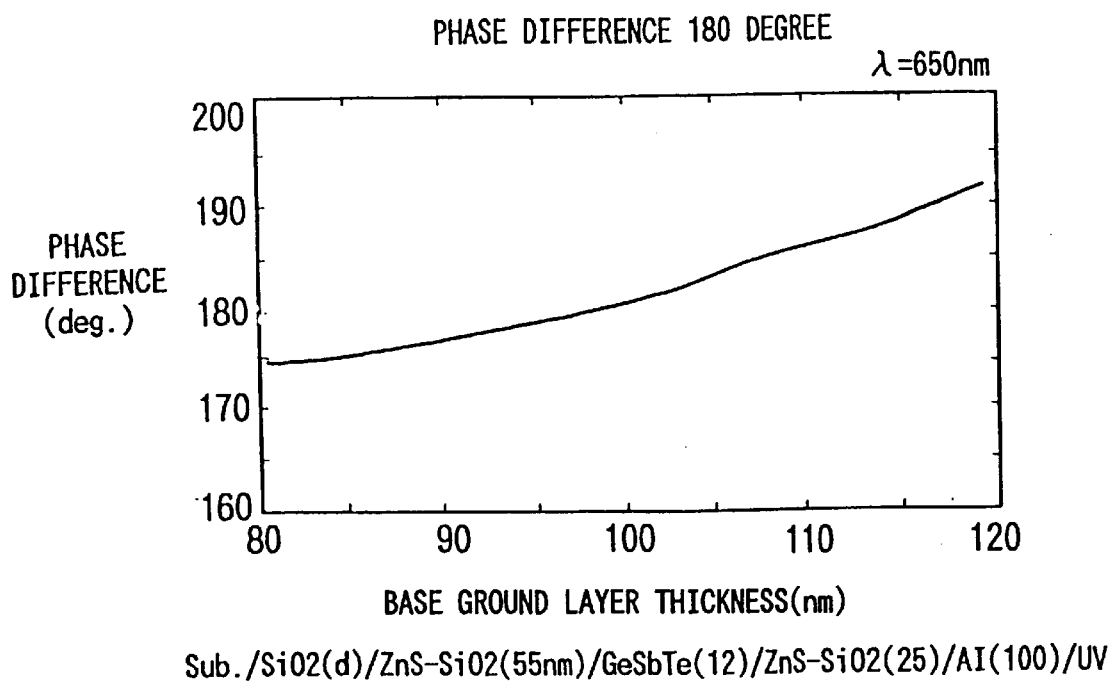
FIGS. 3 and 4 are graphs showing the relationship between the film thickness and the optical phase difference of the optical data recording medium according to the present invention.
Figure 4:
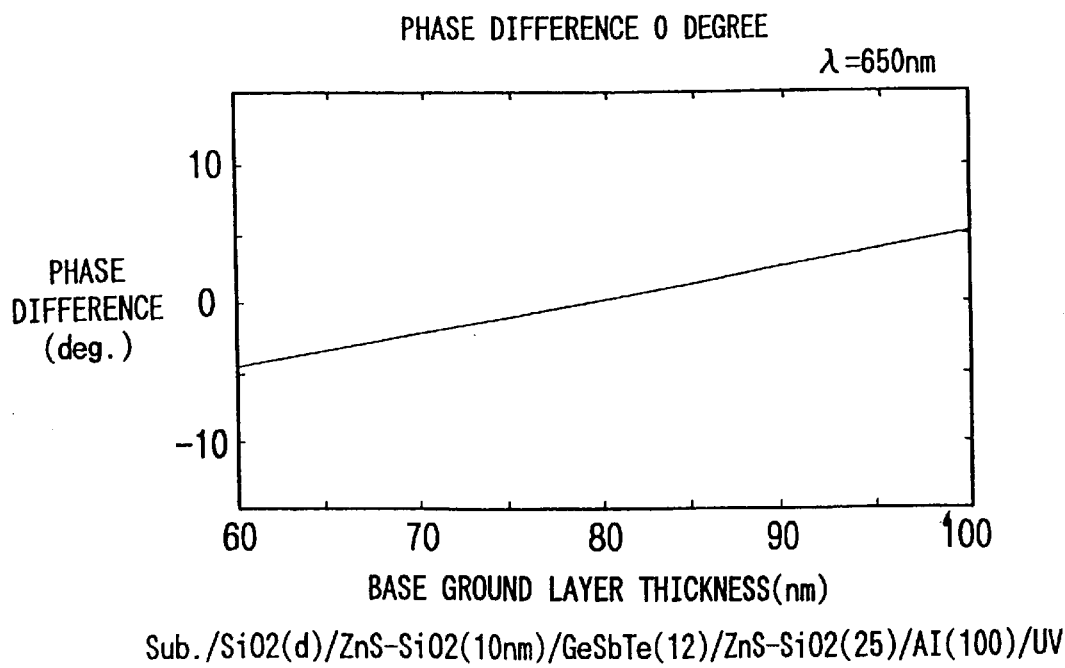

FIGS. 3 and 4 show variations of the optical phase difference of a reflected beam with base film thickness variations in case when $SiO_2$ is selected for the base film. With the prior art structure shown in FIG. 5, in the case of setting the protective film thickness such that the phase difference is 180 degrees, a protective film thickness variation of 10 nm resulted in a phase difference variation of about 30 degrees. In contrast, according to the present invention, in the case of setting the protective film thickness such that the phase difference is 180 degrees, the phase difference variation with a base film thickness variation of 10 nm can be held within about 4 degrees. Furthermore, with the prior art structure, when the protective film thickness is set such that the phase difference is 0 degrees, a protective film thickness variation of 10 nm resulted in a phase difference variation of about 17 degrees. In contrast, according to the present invention, in the case of setting the protective film thickness such that the phase difference is 0 degrees, the phase difference variation with a base film thickness variation of 100 nm can be held within 2.4 degrees. It will be appreciated that according to the present invention it is possible to obtain an optical data recording medium, that has a broad film formation margin and an excellent film formation reproducibility compared to the prior art structure.

Referring again to FIG. 1, the illustrated optical data recording medium according to the present invention includes a transparent substrate 1 having tracking guide grooves for laser beam tracking, a base film 2 formed on the substrate 1, a first protective film 3 formed on the base film 2, a phase change type recording film 4 formed on the first protection film 3, a second protective film 5 formed on the recording film 4, and a reflecting film 6 formed on the second protective film 5. Ultraviolet-setting resin 7 is coated for protection on the reflecting film 6.

The substrate 1 is formed by using disc-like glass or plastics, preferably reinforced glass, polycarbonate resin, PMMA resin and polyolefin resin.

As described before, for the base film 2 may be used a material having a refractive index lower than that of the fist protective film 3. Preferably the material has a refractive index close to that of the transparent substrate, e.g., $SiO_2$, $MgF_2$, $CaF_2$, NaF, $Na_3AlF_6$, LiF, $Al_2O_3$, $CeF_3$, MgO, SiO, $ThO_2$, $PbF_2$, $SnO_2$, $La_2O_3$, etc.

The first and second protective films 3 and 5 are formed by using dielectric materials, e.g., $SiO_2$, $Si_3N_4$, AlN, $TiO_2$, ZnS, $ZnS$—$SiO_2$, etc.

The recording film 4 is formed by using charcogenite materials, e.g., those of GeSbTe type, InSbTe type, InSe type, InTe type, AsTeGe type, $TeO_x$—GeSn type, TeSeSn type, SbSeBi type, BiSeGe type, etc.

The reflecting film 6 may be formed by using metals or transparent high refractive index materials, preferably Al, Ai—Ti, Al alloys, Au, Ag, Si, Ge, etc.

A land/groove recording type medium was obtained by setting the working laser wavelength to 650 nm, with a structure equivalent to that shown in FIG. 1, setting a high reflectance index and setting the phase difference to 0 degrees. The substrate 1 was a polycarbonate substrate with pre-groove, having a diameter of 120 mm and a thickness of 0.6 mm. The substrate was of a type for both land and groove recording, having a track pitch of 0.56 μm (with both land and groove widths of 0.56 μm) and a groove depth of 55 nm. The base film 2 was formed by using $SiO_2$, the first and second protective films 3 and 5 were formed by using $ZnS$—$SiO_2$ mixture film (with a refractive index of 2.10), the recording film 4 was formed by using GeSbTe, and the reflecting film 6 was formed by using Al. These films were formed continuously by a magnetron sputtering process. The thicknesses of the ground, first protective, recording, second protective and reflecting films were set to 100, 10, 12, 25 and 100 nmm, respectively. Ultraviolet-setting resin ("SD-301" manufactured by Dainihon Ink) was coated to a thickness of 9.2 μm on the reflecting film.

Characteristics of the disc were evaluated by executing over-writing. Measurements were made by using an optical head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 7 and 4 mW, respectively, to minimize second order harmonic distortion of the reproduced signal. At a 2.13 MHz reproduced signal level obtained with a reproduction power level of 1 mW, an amplitude of 160 mVp-p was obtained. Under the same conditions, alternate over-writing of 8.5 and 2.13 MHz signals was done in a groove part of a groove track with a radius of 45 mm. At a 2.13 MHz reproduced signal level, an amplitude of 165 mVp-p was obtained. Balanced signal levels with the land and groove tracks could thus be confirmed.

A land/groove recording type medium was obtained by setting the working laser wavelength to 650 nm, with a structure equivalent to that shown in FIG. 1, and setting the phase difference to 180 degrees. The substrate 1 was a polycarbonate substrate with pre-groove, having a diameter of 120 mm and a thickness of 0.6 mm. The substrate was of a type for both land and groove recording, having a track pitch of 0.56 μm (with both land and groove widths of 0.56 μm) and a groove depth of 55 nm. The base film 2 was formed by using $SiO_2$, the first and second protective films 3 and 5 were formed by using $ZnS$—$SiO_2$ mixture film, the recording film 4 was formed by using GeSbTe, and the reflecting film 6 was formed by using Al. These films were formed continuously by a magnetron sputtering process. The thicknesses of the ground, first protective, recording, second protective and reflecting films were set to 100, 55, 12, 25 and 100 nmm, respectively. Ultraviolet-setting resin was coated to a thickness of 9.2 μm on the reflecting film.

Characteristics of the disc were evaluated by executing over-writing. Measurements were made by using an optical head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 6 and 3 mW, respectively, to minimize second order harmonic distortion of the reproduced signal. At a 2.13 MHz reproduced signal level obtained with a reproduction power level of 1 mW, an amplitude of 145 mVp-p was obtained. Under the same conditions, alternate over-writing of 8.5 and 2.13 MHz signals was done in a land track with a radius of 45 mm. At a 2.13 MHz reproduced signal level, an amplitude of 150 mVp-p was obtained. Balanced signal levels with the land and groove tracks could thus be confirmed.

For comparison, a land/groove recording type medium was obtained by setting the working laser wavelength to 650 nm, with a structure equivalent to that shown in FIG. 5, and setting the phase difference to 0 degrees. The substrate 1 was a polycarbonate substrate with pre-groove, having a diameter of 120 mm and a thickness of 0.6 mm. The substrate was of a type for both land and groove recording, having a track pitch of 0.56 $\mu$m (with both land and groove widths of 0.56 $\mu$m) and a groove depth of 55 nm. The first and second protective films 3 and 5 were formed by using ZnS—SiO$_2$ mixture film, the recording film 4 was formed by using GeSbTe, and the reflecting film 6 was formed by using Al. These films were formed continuously by a magnetron sputtering process. The thicknesses of the first protective, recording, second protective and reflecting films were set to 170, 12, 25 and 100 nmm, respectively. Ultraviolet-setting resin was coated to a thickness of 9.2 $\mu$m on the reflecting film.

Characteristics of the disc were evaluated by executing over-writing. Measurements were made by using an optical head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 7.5 and 3.8 mW, respectively, to minimize second order harmonic distortion of the reproduced signal. At a 2.13 MHz reproduced signal level obtained with a reproduction power level of 1 mW, an amplitude of 170 mVp-p was obtained. Under the same conditions, alternate over-writing of 8.5 and 2.13 MHz signals was done in a groove part of a groove track with a radius of 45 mm. At a 2.13 MHz reproduced signal level, an amplitude of 140 mVp-p was obtained. Balanced signal levels with the land and groove tracks could thus be confirmed. Subsequently, the thicknesses of the individual layers of the disc were measured with a step type thickness gauge. The thickness of the first protective film was 175 nm, which was greater than a design value.

For comparison, a land/groove recording type medium was obtained by setting the working laser wavelength to 650 nm, with a structure equivalent to that shown in FIG. 5, setting the phase difference to 180 degree. The substrate 1 was a polycarbonate substrate with pre-groove, having a diameter of 120 mm and a thickness of 0.6 mm. The substrate was of a type for both land and groove recording, having a track pitch of 0.56 $\mu$m (with both land and groove widths of 0.56 $\mu$m) and a groove depth of 55 nm. The first and second protective films 3 and 5 were formed by using ZnS—SiO$_2$ mixture film, the recording film 4 was formed by using GeSbTe, and the reflecting film 6 was formed by using Al. These films were formed continuously by a magnetron sputtering process. The thicknesses of the first protective, recording, second protective and reflecting films were set to 200, 12, 25 and 100 nmm, respectively. Ultraviolet-setting resin was coated to a thickness of 9.2 $\mu$m on the reflecting film.

Characteristics of the disc were evaluated by executing over-writing. Measurements were made by using a head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 5.5 and 3 mW, respectively, to minimize second order harmonic distortion of a reproduced signal. At a 2.13 MHz reproduced signal level obtained with reproduciton power level of 1 mW, an amplitude of 160 mVp-p was obtained. Under the same conditions, alternate over-writing of 8.5 and 2.13 MHz signals was done in a groove part of a groove track with a radius of 45 mm. At a 2.13 MHz reproduced signal level, an amplitude of 110 mVp-p was obtained. Balanced signal levels with the land and groove tracks could thus be confirmed. Subsequently, the thicknesses of the indivisual layers of the disc were measured with a step type thickness gauge. The thickness of the first protective film was 205 nm, which was greater than a design value.

A land/groove recording type medium was obtained by setting the working laser wavelength to 650 nm, with a structure equivalent to that shown in FIG. 1, and setting the phase difference to 0 degrees. The substrate 1 was a polycarbonate substrate with pre-groove, having a diameter of 120 mm and a thickness of 0.6 mm. The substrate was of a type for both land and groove recording, having a track pitch of 0.56 $\mu$m (with both land and groove widths of 0.56 $\mu$m) and a groove depth of 55 nm. The base film 2, first and second protective films 3 and 5 were formed by using Al$_2$O$_3$ (refractive index of 1.62), and ZnS—SiO$_2$ mixture film, respectively, the recording film 4 was formed by using GeSbTe, and the reflecting film 6 was formed by using Al. These films were formed continuously by a magnetron sputtering process. The thicknesses of the ground, first protective, recording, second protective and reflecting films were set to 150, 20, 12, 25 and 100 nmm, respectively. Ultraviolet-setting resin was coated to a thickness of 9.2 $\mu$m on the reflecting film.

Characteristics of the disc were evaluated by executing over-writing. Measurements were made by using a head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 8 and 4 mW, respectively, to minimize second order harmonic distortion of the reproduced signal. At a 2.13 MHz reproduced signal level obtained with reproduciton power level of 1 mW, an amplitude of 190 mVp-p was obtained. Under the same conditions, alternate over-writing of 8.5 and 2.13 MHz signals was done in a groove part of a groove track with a radius of 45 mm. At a 2.13 MHz reproduced signal level, an amplitude of 195 mVp-p was obtained. Balanced signal levels with the land and groove tracks could thus be confirmed.

A land/groove recording type medium was obtained by setting the working laser wavelength to 650 nm, with a structure equivalent to that shown in FIG. 1, and setting the phase difference to 0 degrees. The substrate 1 was a polycarbonate substrate with pre-groove, having a diameter of 120 mm and a thickness of 0.6 mm. The substrate was of a type for both land and groove recording, having a track pitch of 0.56 $\mu$m (with both land and groove widths of 0.56 $\mu$m) and a groove depth of 55 nm. The base film 2, and first and second protective films 3 and 5 were formed by using SnO$_2$ (refractive index of 1.90), ZnS—SiO$_2$ mixture film, respectively, the recording film 4 was formed by using GeSbTe, and the reflecting film 6 was formed by using Al. These films were formed continuously by a magnetron sputtering process. The thicknesses of the ground, first protective, recording, second protective and reflecting films were set to 200, 10, 12, 25 and 100 nmm, respectively. Ultraviolet-setting resin was coated to a thickness of 9.2 μm on the reflecting film.

Characteristics of the disc were evaluated by executing over-writing. Measurements were made by using head, on which a semiconductor laser with a wavelength of 650 nm and an objective lens with an NA of 0.60 are mounted. Signals at 8.5 and 2.13 MHz were over-written alternately in a groove part of a groove track with a radius of 45 mm by rotating the disc after initialization at a linear speed of 5.8 m/s. The recording and erasing power levels were set to 7 and 3.4 mW, respectively, to minimize second order harmonic distortion of reproduced signal. At a 2.13 MHz reproduced signal level obtained with reproduciton power level of 1 mW, an amplitude of 180 mVp-p was obtained. Under the same conditions, alternate over-writing of 8.5 and 2.13 MHz signals was done in a groove part of a groove track with a radius of 45 mm. At a 2.13 MHz reproduced signal level, an amplitude of 185 mVp-p was obtained. Balanced signal levels with the land and groove tracks could thus be confirmed.

A land/groove recording type medium was obtained by setting the working laser wavelength to 650 nm, with a structure equivalent to that shown in FIG. 1, and setting a high reflectance difference and setting the phase difference to 0 degrees. The substrate 1 was a polycarbonate substrate with pre-groove, having a diameter of 120 mm and a thickness of 0.6 mm. The substrate was a substrate of a type for both land and groove recording, having a track pitch of 0.56 μm (with both land and groove widths of 0.56 μm) and a groove depth of 55 nm. The base film 2, and first and second protective films 3 and 5 were formed by using $SiO_2$, and ZnS—$SiO_2$ (refractive index of 2.10) mixture film, respectively, the recording film 4 was formed by using GeSbTe, and the reflecting film 6 was formed by using Si. These films were formed continuously by a magnetron sputtering process. The thicknesses of the ground, first protective, recording, second protective and reflecting films were set to 150, 120, 12, 15 and 100 nmm, respectively. Ultraviolet-setting resin was coated to a thickness of 9.2 μm on the reflecting film.

Characteristics of the disc were evaluated by executing over-writing. Measurements were made by using a head, on which a semiconductor laser with a wavelength of 650 nm and an objective lens with an NA of 0.60 are mounted. Signals at 3 and 3.4 MHz were over-written alternately in a groove part of a groove track with a radius of 45 mm by rotating the disc after initialization at a linear speed of 12.0 m/s. The recording and erasing power levels were set to 10 and 5 mW, respectively, to minimize second order harmonic distortion of reproduced signal. At a 3.4 MHz reproduced signal level obtained with reproduciton power level of 1 mW, an amplitude of 200 mVp-p was obtained. Under the same conditions, alternate over-writing of 13.5 and 3.4 MHz signals was done in a groove part of a groove track with a radius of 45 mm. At a 3.4 MHz reproduced signal level, an amplitude of 195 mVp-p was obtained. Balanced signal levels with the land and groove tracks could thus be confirmed.

A land/groove recording type medium was obtained by setting the working laser wavelength to 650 nm, with a structure equivalent to that shown in FIG. 1, and setting the phase difference to 180 degrees. The substrate 1 was a polycarbonate substrate with pre-groove, having a diameter of 120 mm and a thickness of 0.6 mm. The substrate was a substrate of a type for both land and groove recording, having a track pitch of 0.56 μm (with both land and groove widths of 0.56 μm) and a groove depth of 55 nm. The base film 2, and first and second protective films 3 and 5 were formed by using $SiO_2$, and ZnS—$SiO_2$ mixture film, respectively, the recording film 4 was formed by using GeSbTe, and the reflecting film 6 was formed by using Si. These films were formed continuously by a magnetron sputtering process. The thicknesses of the ground, first protective, recording, second protective and reflecting films were set to 150, 65, 12, 15 and 100 nmm, respectively. Ultraviolet-setting resin was coated to a thickness of 9.2 μm on the reflecting film.

Characteristics of the disc were evaluated by executing over-writing. Measurements were made by using a head, on which a semiconductor laser with a wavelength of 650 nm and an objective lens with an NA of 0.60 are mounted. Signals at 13.5 and 3.4 MHz were over-written alternately in a groove part of a groove track with a radius of 45 mm by rotating the disc after initialization at a linear speed of 12.0 m/s. The recording and erasing power levels were set toll and 5.8 mW, respectively, to minimize second order harmonic distortion of reproduced signal. At a 3.4 MHz reproduced signal level obtained with reproduciton power level of 1.5 mW, an amplitude of 255 mVp-p was obtained. Under the same conditions, alternate over-writing of 13.5 and 3.4 MHz signals was done in a groove part of a groove track with a radius of 45 mm. At a 13.4 MHz reproduced signal level, an amplitude of 250 mVp-p was obtained. Balanced signal levels with the land and groove tracks could thus be confirmed.

As has been described in the foregoing, according to the present invention, it is possible to form a ground layer having a relatively small thickness to prevent damage to the substrate in over-writing, and also a degree of freedom is provided in the thickness setting. It is thus possible to obtain an optical data recording medium, which has broad film formation margin and excellent film formation reproducibility compared to the prior art structure.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An optical data recording medium utilizing reversible inter-crystalline-amorphous phase changes for recording, reproducing and erasing data as phase changes of a recording film caused by laser beam irradiation, comprising a transparent substrate having tracking guide grooves for laser beam tracking, a base film formed on the substrate, a first protective film formed on the base film, a phase change type recording film formed on the first protective film, a second protective film formed on the recording film, and a reflecting film formed on the second protective film, wherein the base film is formed using a material having a refractive index lower than that of the first protective film.

2. The optical data recording medium according to claim 1, further comprising a protective resin formed on the reflecting film.

3. The optical data recording medium according to claim 2, wherein a lamination of polycarbonate substrate, $SiO_2$ base film, ZnS—SiO$_2$ first protective film, GeSbTe recording film, ZnS—SiO$_2$ second protective film, Al reflecting film and ultra-violet-setting protective resin is formed.

4. The optical data recording medium according to claim 2, wherein the substrate is formed by using disc-like glass or plastics of one of reinforced glass, polycarbonate resin, PMMA resin and polyolefin resin.

5. The optical data recording medium according to claim 1, wherein the base film is formed by selecting a material having a refractive index optically lower than that of the first protective film and close to that of the substrate.

6. The optical data recording medium according to claim 1, wherein the first protective film is formed using ZnS—SiO$_2$ and the substrate is formed using a polycarbonate resin, the first protective film and the substrate having refractive indexes of 2.10 and 1.59, respectively, at a wavelength of 650 nm.

7. The optical data recording medium according to claim 1, wherein the base film is the material having a refractive index close to that of the transparent substrate selected among SiO$_2$, MgF$_2$, CaF$_2$, NaF, Na$_3$AlF$_6$, LiF, Al$_2$O$_3$, CeF$_3$, MgO, SiO, ThO$_2$, PbF$_2$, SnO$_2$ and La$_2$O$_3$.

8. The optical data recording medium according to claim 1, wherein the first and second protective films are formed by using dielectric materials selected among SiO$_2$, Si$_3$N$_4$, AlN, TiO$_2$, ZnS and ZnS—SiO$_2$.

9. The optical data recording medium according to claim 1, wherein the recording film is formed by using charcogenite materials selected among GeSbTe type, InSbTe type, InSe type, InTe type, AsTeGe type, TeO$_x$—GeSn type, TeSeSn type, SbSeBi type and BiSeGe type.

10. The optical data recording medium according to claim 1, wherein the reflecting film is formed by using metals or transparent high refractive index materials selected among Al, Ai—Ti, Al alloys, Au, Ag, Si and Ge.

11. An optical data recording medium utilizing reversible inter-crystalline-amorphous phase changes for recording, reproducing and erasing data as phase changes of a recording film caused by laser beam irradiation, comprising a transparent substrate having tracking guide grooves for laser beam tracking, a base film formed on the substrate, a first protective film formed on the base film, a phase change type recording film formed on the first protective film, a second protective film formed on the recording film, and a reflecting film formed on the second protective film, wherein the refractive index of the base film is lower than that of the first protective film, and wherein data is recorded in both land and groove parts of the tracking guide grooves.

12. The optical data recording medium according to claim 11, wherein the phase difference of reflected light beams from crystalline and amorphous portions of the recording film is set to the neighborhood of 0 degrees.

13. The optical data recording medium according to claim 11 wherein the phase difference of reflected light beams from crystalline and amorphous portions of the recording film is set to the neighborhood of 180 degrees.

* * * * *